(12) United States Patent
Silva et al.

(10) Patent No.: US 10,176,005 B2
(45) Date of Patent: Jan. 8, 2019

(54) ENVIRONMENT VIRTUALIZATION

(71) Applicants: Steve Silva, Kennewick, WA (US);
Chris Spiegel, Richland, WA (US);
Philip Tilton, Richland, WA (US)

(72) Inventors: Steve Silva, Kennewick, WA (US);
Chris Spiegel, Richland, WA (US);
Philip Tilton, Richland, WA (US)

(73) Assignee: Cypherpath, Inc., Herndon, VA (US)

( * ) Notice: Subject to any disclaimer, the term of this patent is extended or adjusted under 35 U.S.C. 154(b) by 0 days.

(21) Appl. No.: 14/645,429

(22) Filed: Mar. 12, 2015

(65) Prior Publication Data

US 2015/0301847 A1 Oct. 22, 2015

Related U.S. Application Data

(60) Provisional application No. 61/972,411, filed on Mar. 31, 2014.

(51) Int. Cl.
*G06F 9/455* (2018.01)
*G06F 9/50* (2006.01)
*G06F 9/54* (2006.01)

(52) U.S. Cl.
CPC ........ *G06F 9/45558* (2013.01); *G06F 9/5077* (2013.01); *G06F 9/54* (2013.01); *G06F 9/45545* (2013.01); *G06F 2009/45595* (2013.01)

(58) Field of Classification Search
CPC ...... G06F 9/45558; G06F 9/5077; G06F 9/54; G06F 9/45554; G06F 2009/45595

(Continued)

(56) References Cited

U.S. PATENT DOCUMENTS 7,496,576 B2 * 2/2009 Bernabeu-Auban ........................ H04L 63/101
8,219,987 B1 * 7/2012 Vlaovic .................... G06F 9/44 717/148

(Continued)

FOREIGN PATENT DOCUMENTS

EP 2595346 A1 7/2014
WO 2014031988 2/2014

(Continued)

OTHER PUBLICATIONS

"Hypervisor," TechTarget, Dec. 2016, last retrieved from http://searchservervirtualization.techtarget.com/definition/hypervisor on Dec. 11, 2017.*

(Continued)

*Primary Examiner* — Andrew M. Lyons
(74) *Attorney, Agent, or Firm* — Corridor Law Group, P.C.

(57) ABSTRACT

An environment virtualization infrastructure (EVI) is made up of storage, network, and compute elements which are virtualized in a virtual platform that is implemented on a hardware platform. In some embodiments, the EVI is dynamic and is expressed as a collection of downloadable data structures. The virtual platform can include an EVI with a definable topology and an emulator that configures various components of the EVI automatically. In some embodiments, the emulator is invoked via an Application Programming Interface. The EVI can be implemented as a Software as a Service. In some embodiments, the EVI includes virtual environments that have routers, switches, operating systems, and software applications.

6 Claims, 4 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 8,345,692 | B2* | 1/2013 | Smith | H04L 12/462 370/396 |
| 8,396,989 | B2* | 3/2013 | Chaturvedi | G06F 9/5027 709/238 |
| 8,443,239 | B2 | 5/2013 | Phaltankar | |
| 8,631,458 | B1* | 1/2014 | Banerjee | G06F 9/45558 718/1 |
| 8,843,925 | B1* | 9/2014 | Beda, III | G06F 9/5077 718/1 |
| 9,015,712 | B1* | 4/2015 | Hodge | G06F 9/455 717/174 |
| 9,342,330 | B2* | 5/2016 | Pohlmann | G06F 9/455 |
| 2003/0131078 | A1* | 7/2003 | Scheer | H04L 41/0213 709/220 |
| 2006/0064619 | A1 | 3/2006 | Wen et al. | |
| 2008/0163210 | A1* | 7/2008 | Bowman | G06F 9/4843 718/1 |
| 2009/0279518 | A1* | 11/2009 | Falk | H04L 29/12264 370/338 |
| 2009/0288084 | A1* | 11/2009 | Astete | G06F 9/45533 718/1 |
| 2010/0070952 | A1* | 3/2010 | Anand | G06F 8/68 717/139 |
| 2010/0107162 | A1* | 4/2010 | Edwards | G06F 9/5077 718/1 |
| 2010/0235831 | A1* | 9/2010 | Dittmer | G06F 9/45558 718/1 |
| 2010/0278076 | A1* | 11/2010 | Reddy | H04L 41/0806 370/254 |
| 2010/0313200 | A1* | 12/2010 | Rozee | G06F 8/61 718/1 |
| 2011/0022694 | A1* | 1/2011 | Dalal | H04L 41/0843 709/222 |
| 2011/0154320 | A1* | 6/2011 | Verma | G06F 8/63 718/1 |
| 2011/0320598 | A1* | 12/2011 | Solin | G06F 9/5072 709/225 |
| 2012/0131577 | A1* | 5/2012 | Arcese | G06F 8/60 718/1 |
| 2012/0185913 | A1* | 7/2012 | Martinez | G06F 9/455 726/1 |
| 2013/0060919 | A1* | 3/2013 | Khandekar | G06F 9/45558 709/220 |
| 2013/0074064 | A1* | 3/2013 | Das | G06F 8/61 718/1 |
| 2013/0111468 | A1* | 5/2013 | Davis | G06F 9/5077 718/1 |
| 2013/0133061 | A1* | 5/2013 | Fainkichen | H04W 76/10 726/15 |
| 2013/0198740 | A1 | 8/2013 | Arroyo et al. | |
| 2013/0227563 | A1* | 8/2013 | McGrath | G06F 9/45533 718/1 |
| 2013/0283265 | A1* | 10/2013 | Acharya | G06F 9/45558 718/1 |
| 2013/0339510 | A1* | 12/2013 | Douglas | H04L 41/5077 709/223 |
| 2014/0040299 | A1 | 2/2014 | Datla et al. | |
| 2014/0059196 | A1 | 2/2014 | Onffroy et al. | |
| 2014/0059385 | A1 | 2/2014 | Dolinsky et al. | |
| 2014/0059570 | A1 | 2/2014 | Nandyalam et al. | |
| 2014/0123129 | A1* | 5/2014 | Risbood | G06F 8/61 717/176 |
| 2014/0126418 | A1* | 5/2014 | Brendel | H04L 12/4641 370/254 |
| 2014/0136712 | A1* | 5/2014 | Kim | H04L 47/70 709/226 |
| 2014/0254603 | A1* | 9/2014 | Banavalikar | H04L 69/03 370/401 |
| 2014/0380308 | A1* | 12/2014 | Hassine | G06F 9/45558 718/1 |
| 2015/0026667 | A1* | 1/2015 | Pruss | G06F 11/3664 717/135 |
| 2015/0082418 | A1* | 3/2015 | Gu | H04L 12/4633 726/15 |

FOREIGN PATENT DOCUMENTS

| | | | | |
|---|---|---|---|---|
| WO | 2014031991 | | 2/2014 | |
| WO | WO-2016206171 | A1 * | 12/2016 | ............ H04L 29/06 |

OTHER PUBLICATIONS

"Namespace," Wikipedia, Dec. 18, 2017, last retrieved from https://en.wikipedia.org/wiki/Namespace on Dec. 11, 2017.*

Koslovski, "Dynamically Provisioned Virtual Infrastructures: Specification, Allocation and Execution", Thesis, (2011), pp. 1-168.

Etchevers et al., "Self-Configuration of Distributed Applications in the Cloud", 2011 IEEE 4th International Conference of Cloud Computing, (2011), pp. 668-675.

Raghavendra et al., "Dynamic Graph Query Primitives for SDN-based Cloud Network Management" (2012), pp. 97-102.

International Search Report and Written Opinion dated Sep. 10, 2015 in connection with PCT/US2015/020615.

* cited by examiner

ENVIRONMENT VIRTUALIZATION

CROSS-REFERENCE TO RELATED APPLICATION

This application is related to and claims priority benefits from U.S. provisional patent application Ser. No. 61/972,411 having a filing date of Mar. 31, 2014, entitled "Virtualized Converged Infrastructure". The '411 provisional application is hereby incorporated by reference in its entirety.

FIELD OF THE INVENTION

The present invention relates to creating and maintaining virtualized IT infrastructure environments.

BACKGROUND OF THE INVENTION

Cloud infrastructures typically include compute, network and storage elements. Deployments of cloud infrastructures are typically composed of physical and virtual dependencies. These dependencies are independently configured and provisioned on demand as needed.

Infrastructure elements can be configured to know about each other and to allow them to communicate with one another. Configuration of cloud infrastructure deployments typically requires significant manual effort. Moreover, the infrastructure can be tied to specific physical and virtual dependencies.

In existing cloud infrastructure technologies, a cloud infrastructure can be assembled from a variety of compute, network, and storage technologies. In some cases, the cloud infrastructure can be integrated and validated before installation so as to speed deployment and guarantee interoperability between the hardware and software components.

Cloud infrastructure can assist backup, workload balancing and disaster recovery within a data center, for example, or across more than one data center.

In some cases, cloud infrastructures include a cloud management system. The management system can enable cloud operations and improve productivity. Moreover, the cloud management system can validate updates prior to installation to reduce risk.

The cloud management system can, in addition, provide a level of application optimization, and streamline infrastructure support.

One shortcoming of the conventional cloud infrastructure is the significant effort required to provision and configure the infrastructure. Another shortcoming is the reliance on special purpose hardware (such as switches, routers, and storage systems) for compute, network and storage elements of the cloud infrastructure. A further shortcoming is the significant time and effort required to re-configure existing infrastructure and/or deploy additional infrastructure in an operational cloud infrastructure.

SUMMARY OF THE INVENTION

An Environment Virtualization Infrastructure (EVI) can comprise three type of elements—storage, network, and compute elements.

Environment Virtualization as described herein can virtualize storage, network and compute elements in a single virtual platform or system.

Environment Virtualization can be expressed in data structures and can be implemented on one or more hardware platforms. Compute, network, and storage elements can be provisioned independently, or collectively, on the hardware platforms according to the data structures describing the infrastructure.

In some embodiments an EVI can be expressed as a disk image (or other suitable data file format), and can be downloaded or transferred via storage media, for example removable media.

In some embodiments the EVI can include: a router; a switch; and operating system; a software application; an Application Programming Interface (API); and a remote interface. In some embodiments, the remote interface is a web interface.

An EVI can be configured for a user to specify the infrastructure, to define a topology and to compile and create components within the infrastructure. Elements can include storage, network or compute elements, or a suitable combination of the three.

In some embodiments the EVI can be dynamic and a user can start, stop, add and remove components while other components can continue to run.

In one example the virtual platform or system has an emulator. The emulator can provision the EVI using its defined data structures and can configure components of the infrastructure automatically—without manual intervention. In some embodiments, the emulator is invoked from a user interface via an API.

Data structures can be defined to meet the user's infrastructure requirements. The users' requirements can include, for example, networks, communications between networks, machines and operating systems, installed software applications and services. Data structures can be created inside a topology as described in more detail below.

A user can override manually if specific configurations are required.

The virtual platform or system can interpret the data structures in real-time. Configurations of the EVI can be optimized based on dynamic information.

Interpretation of the data structures includes generating instructions to infrastructure elements on how to behave. Infrastructure elements can include storage, compute and network elements, and lower level subsystems.

The system described herein includes actionable data structures and an interpreter installed on commodity hardware. The actionable data structures can be copied or moved from a first instance of physical hardware to a second instance.

In some cases the EVI can be implemented as Software as a Service (SaaS), Infrastructure as a Service (IaaS) or Platform as a Service (PaaS). For example, in a SaaS implementation, the user can be provided with an account at a data centre.

The requirements for the EVI, as expressed for example in the data structures described above, can be modified to suit known limitations of the provisioned hardware.

More than one EVI can be implemented on the same set of commodity hardware and isolated from one another if desired. Compute, network and storage dependencies can be handled dynamically as virtual resources within isolated environments.

An EVI can be defined and configured by defining an infrastructure topology, provisioning via an emulator a plurality of virtual resources according to the infrastructure topology; making changes via the emulator to an infrastructure component during operation of the EVI; and adding via the emulator an infrastructure component to the infrastructure topology during operation of the EVI.

An EVI can be operated by generating a link layer address by an emulator for a virtual switch interface and a virtual machine in a virtual environment; creating a logical graph of connections between the virtual switch interface and a virtual tunneling interface; determining a link layer address switching table by the emulator, wherein the link layer address switching table comprises a connection between the virtual switch interface and the virtual tunneling interface; programming the link layer address switching table with the link layer address; and maintaining the link layer address in the link layer address switching table. In some embodiments the link layer address is a media access control (MAC) address. In other or the same embodiments, the link layer address is generated according a pseudo-random sequence.

DEFINITION OF TERMS

Copy-on-write: is an optimization strategy used in computer programming such that when multiple separate tasks use identical copies of the same data, it is not necessary to create separate copies of the data for each process; instead, pointers to the same resource can be given to each task.

Environment: is an isolated topology that the system uses to virtualize, automate, and configure IT infrastructure.

Hub: is like a switch, except instead of sending traffic to the target device, it broadcasts the message to most, if not all, attached devices.

Hypercloning: describes the automatic creation, optional persistence, and automatic garbage collection of virtual machine disk images.

Hypervisor or virtual machine monitor (VMM): is a piece of computer software, firmware or hardware that creates and runs virtual machines.

IP address: is a numerical label used to identify a network interface of a computer or other network node participating in a computer network. It is divided into two logical parts, the network prefix and the host identifier. All hosts on a subnetwork have the same network prefix.

Master image: is a template for a virtual machine (VM), virtual desktop, server or hard disk drive. A master image can be created by setting up a computing environment in a particular way and then saving the disk image as a pattern for making more copies.

Netmask: is the routing prefix of an IP address and occupies the most-significant bits of the address.

Network address translation (NAT): is a methodology of modifying network address information in Internet Protocol (IP) datagram packet headers while they are in transit across a traffic routing device for the purpose of remapping one IP address space into another.

Persistence: is the characteristic of state of a digital logic circuit or computer program that outlives the process that created it.

Port forwarding: is a name given to the combined technique of translating the address or port number of a packet to a new destination, filtering the packet using a firewall, and forwarding the packet according to a routing table.

Switch: links network devices or segments together. A switch is more intelligent than a hub and can receive messages from devices connected to it and then can transmit messages only to the intended destination device.

DETAILED DESCRIPTION OF PREFERRED EMBODIMENT(S)

Figure 1:
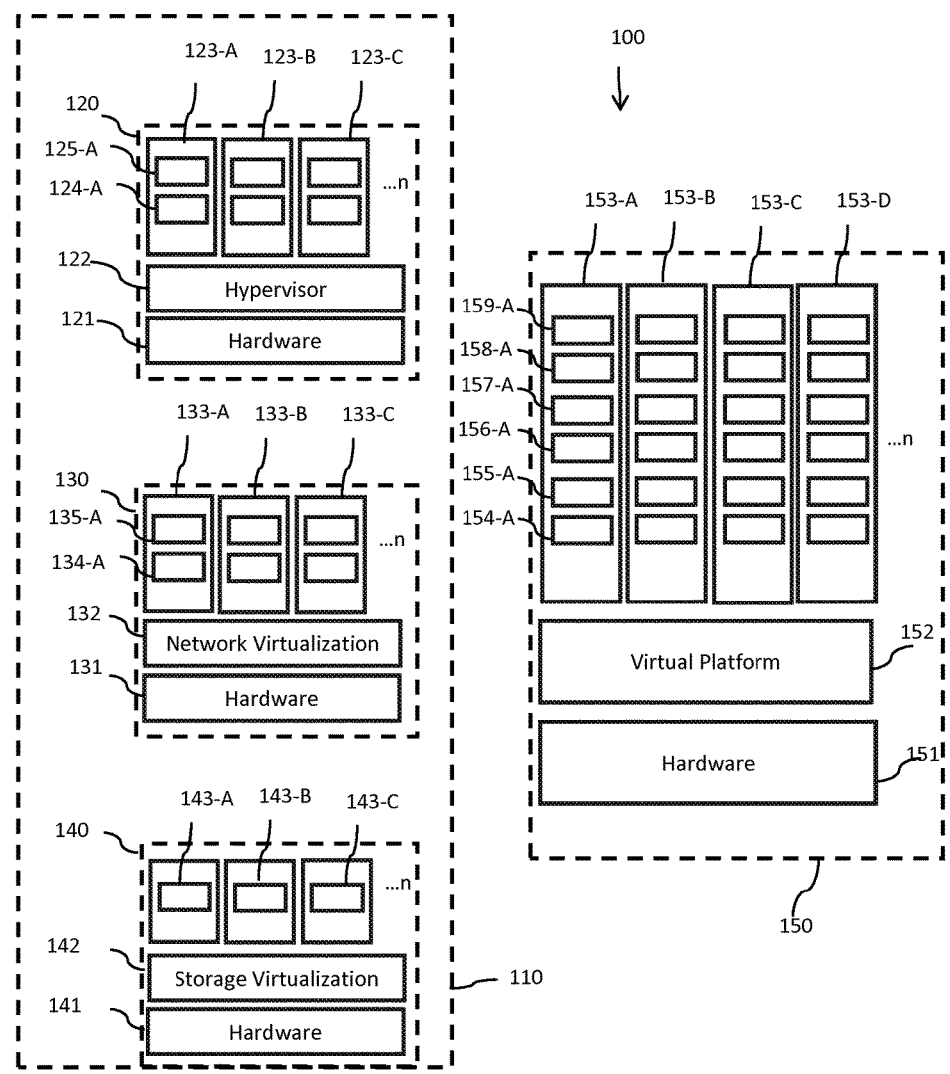
FIG. 1 is a schematic illustrating a comparison of a cloud infrastructure and an example embodiment of an environment virtualization infrastructure (EVI).

FIG. 1 is a schematic illustrating a comparison of cloud infrastructure 110 and an example embodiment of an environment virtual infrastructure (EVI) 150. Examples of cloud infrastructure, such as cloud infrastructure 110 of FIG. 1, can be found in the prior art. Cloud infrastructure 110 includes compute element 120, networking element 130 and storage element 140.

Compute element 120 includes physical hardware 121 with hypervisor 122 and one or more machines (for example, machines 123-A through 123-C) with operating systems and software applications installed. For example, machine 123-A includes operating system 124-A and software application 125-A.

Networking element 130 includes physical hardware 131 with network visualization software 132 installed. Networking element 130 further includes one or more networks (for example, networks 133-A through 133-C) comprising one or more routers and switches. For example, network 133-A includes router 134-A and switch 135-A.

Storage element 140 includes physical hardware 141 with storage virtualization software 142 and one or more storage volumes (for example, storage volumes 143-A through 143-C) installed.

EVI 150 provides a number of advantages over cloud infrastructure 110, and these advantages are described elsewhere in the present application.

EVI 150 includes physical hardware 151 with system or virtual platform 152 installed. System or virtual platform 152 is described in more detail in the following paragraphs. EVI 150 further includes one or more virtual environments (for example, virtual environments 153-A through 153-D). Each virtual environment 153A through 153-D can include configurations, volumes, routers, switches, operating systems and software applications, or a suitable combination. For example, virtual environment 153-A includes configuration 154A, volume 155A, router 156A, switch 157A, operating system 158A and software application 159A. The physical hardware 151 in EVI 150 can be commodity hardware.

Figure 2:
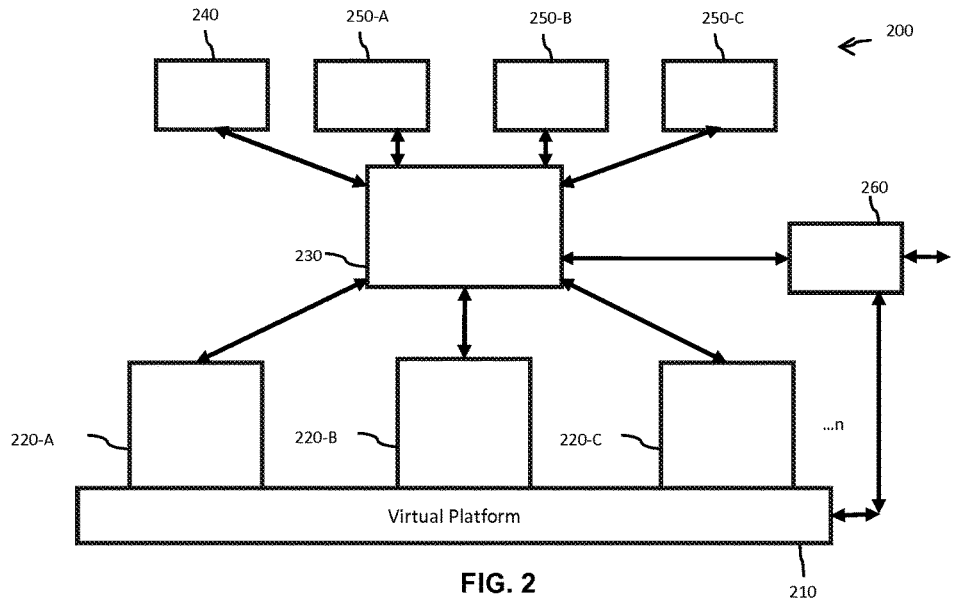
FIG. 2 is a schematic illustrating another embodiment of an environment virtualization infrastructure (EVI).

FIG. 2 is a schematic illustrating another embodiment of an EVI 200. EVI 200 includes virtual platform 210 and one or more environments (for example, environments 220-A through 220-C). EVI 200 further includes web interface 230, system administrator 240, and application programming interfaces (APIs) 260. System administrator 240 can be assigned to manage EVI 200 and one or more users (for example, users 250-A through 250-C). Users can be assigned as owners of particular environments. For example, user 250-A can be assigned as owner of environment 220-A, user 250-B can be assigned as owner of environment 220-B, and user 250-C can be assigned as owner of environment 230-C.

An environment (such as one of environments 220-A through 220-C) can be shared with users other than the owner of the environment. For example, environment 220-A can be shared with users 250-B and 250-C.

Figure 3:
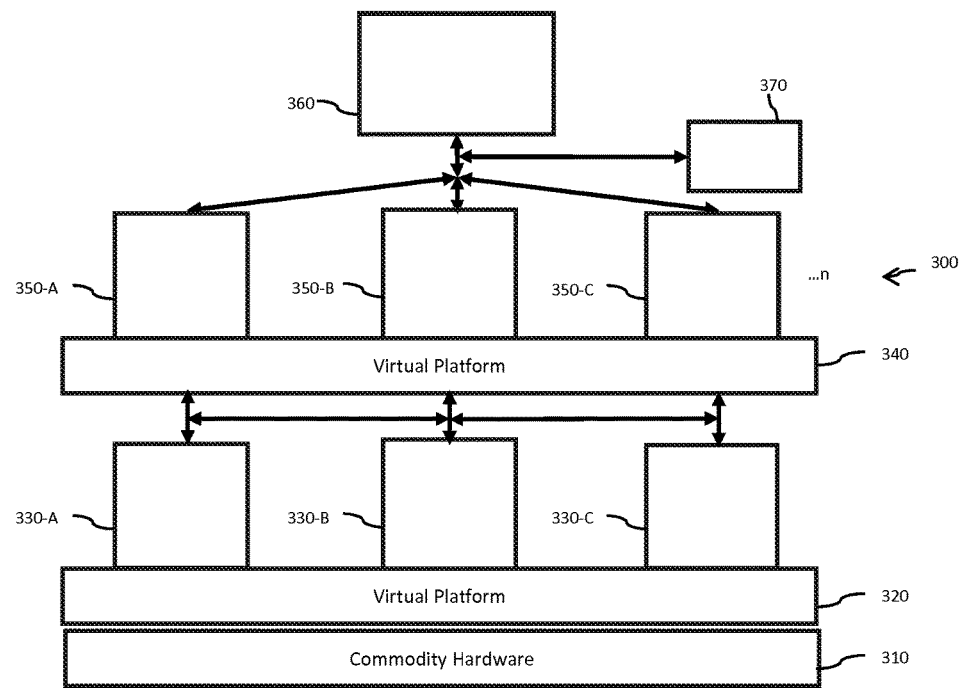
FIG. 3 is a schematic illustrating compute, network and storage elements of an EVI (such as the EVI of FIG. 2).

FIG. 3 is a schematic illustrating compute, network and storage elements of an EVI 300 (such as EVI 200 of FIG. 2). EVI 300 of FIG. 3 includes compute element 330-A, network element 330-B and storage element 330-C. EVI 300 further includes commodity hardware 310, virtual platforms 320 and 340, and one or more virtual environments (for example, 350-A through 350-C)), remote interface 360 and one or more application programming interfaces (APIs) 370.

Compute, network and storage elements (330-A through 330-C respectively) can be used to create topologies for one or more virtual environments (for example, 350-A through 350-C).

In the following paragraphs, an EVI (such as EVI 200 of FIG. 2 and EVI 300 of FIG. 3) is sometimes referred to as the system.

The system can include one or more environments. Each environment can have a topology associated with it that describes the environment's IT infrastructure. The environment's IT infrastructure can include networks and machines, and their individual settings and connections.

The system can include a user interface such as a graphical user interface (GUI). A user of the system can use the GUI a) to create, access and modify environment topologies, b) to upload, edit and delete files and disk images, and c) to view system status and modify system settings. The GUI can include a dashboard, for example.

In some implementations, the system can include an application programming interface (API). The API can perform some or all of the functions performed by a user via the user interface.

The system can be configured so that, by default, machines added to new topologies automatically persist. For topologies with persistence, the system can save changes made to the clones for the machines that are set to persist, even when the environment is stopped. Both individual machines' persistence, as well as the default behavior when creating machines, can be altered within the system.

Memory can be allocated for running each of the environments. In some embodiments, the system can be configured to record the percentage of memory being consumed by the environment.

The system can create one or more environments, and run them independently. The number of environments can be limited by the resources allocated to the system. The environments can be virtualized independently while still sharing the same underlying physical hardware.

Figure 4:
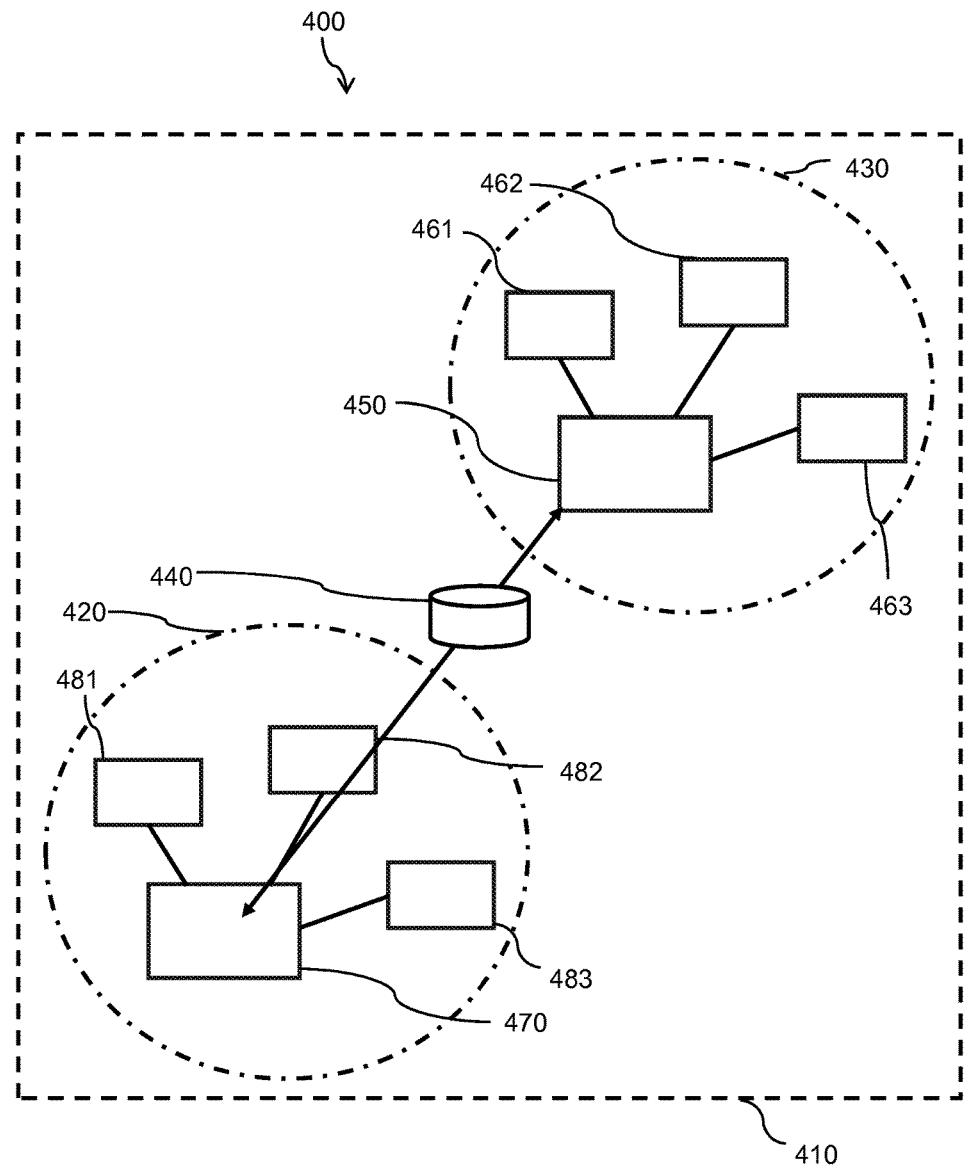
FIG. 4 is a simplified schematic illustrating a display on a user interface of a topology.

FIG. 4 is a simplified schematic illustrating display 400 on a user interface of topology 410. Topology 410 is rendered as components representing networking equipment (switches/hubs) and machines (monitors) with lines connecting the machines to the appropriate networking equipment. The topology can be manipulated by the user interface as desired, for example through zooming and panning.

In the example shown in FIG. 4, topology 410 includes networks 420 and 430, with connecting router 440. Network 420 includes network switch 450 and three machines 461, 462 and 463. Network 430 includes network switch 470 and three machines 481, 482 and 483.

In some implementations, a user can design an IT infrastructure via the user interface. For example, new compute, network, and storage components can be added to an environment topology. A network component, such as a switch or hub, can be added to the topology. Similarly, a network can be deleted from the topology.

Machines can be connected to network switches, networking the machine to the switch and to each other. This is similar to connecting a machine with an Ethernet cable to a switch in the physical world.

Networks can automatically have routes established between them. The emulator knows about the switches and can automatically create a route between them.

The routes can be visualized on the user interface, for example. Routes can be configured as uni-directional or bi-directional.

Networks in a topology can have a number of properties including but not limited to a network name, a network description, mode (switch or hub), an IP address, a netmask, a default gateway and a flag indicating whether it is permitted to add the network to a physical connection.

The network name can be generated automatically by the system. The IP address of the network, combined with the netmask, provides the IP space of the network. The IP address is also used to serve DHCP requests. The default gateway is the gateway that the network should use to route traffic. This only provides the gateway via DHCP, and does not provide the gateway itself.

The system can create many identical machines at once that have the same, or substantially similar, disk image or images, and are connected to the same network or networks. Each machine can be configured individually if desired.

Machines can be persistent or not. In some embodiments, newly-created machines can be persistent by default.

Machines in a topology can have a number of properties including but not limited to a machine name, a machine description, a number of CPUs, a size of allocated RAM, a boot order, a flag indicating whether disk images are persistent and a flag indicting whether the machine can attach to storage.

The run-time of a selected environment can be limited to a value specified by the user. After the specified time has elapsed, the selected environment can be shut off automatically by the system.

A user can add, edit, and remove persistent port forwards to the environment via the user interface. In so doing, certain types of traffic can be configured to connect to the environment without opening up the environment to the network in general.

The forwarder is a port on a web server that forwards traffic to a designated port on a destination machine Each forwarder is associated with the designated port, a destination machine and a network across which traffic is forwarded. A selected forwarder can be deleted and new port forwarders can be added.

The environment includes a storage area where disk images and uploaded files can be stored by the system. In some implementations, a user can access the storage area via the user interface.

Disk images can be created, edited, and removed. The storage area can support one or more disk image formats. A new disk image can be added to the storage area either by placing an existing disk on it or by creating a new empty disk.

The system can display via the user interface a list of existing disk images in the storage area, and actions and characteristics associated with each disk image. Disk images can, for example, be modified, copied, deleted, repaired and/or downloaded in a suitable format.

Figure 5:
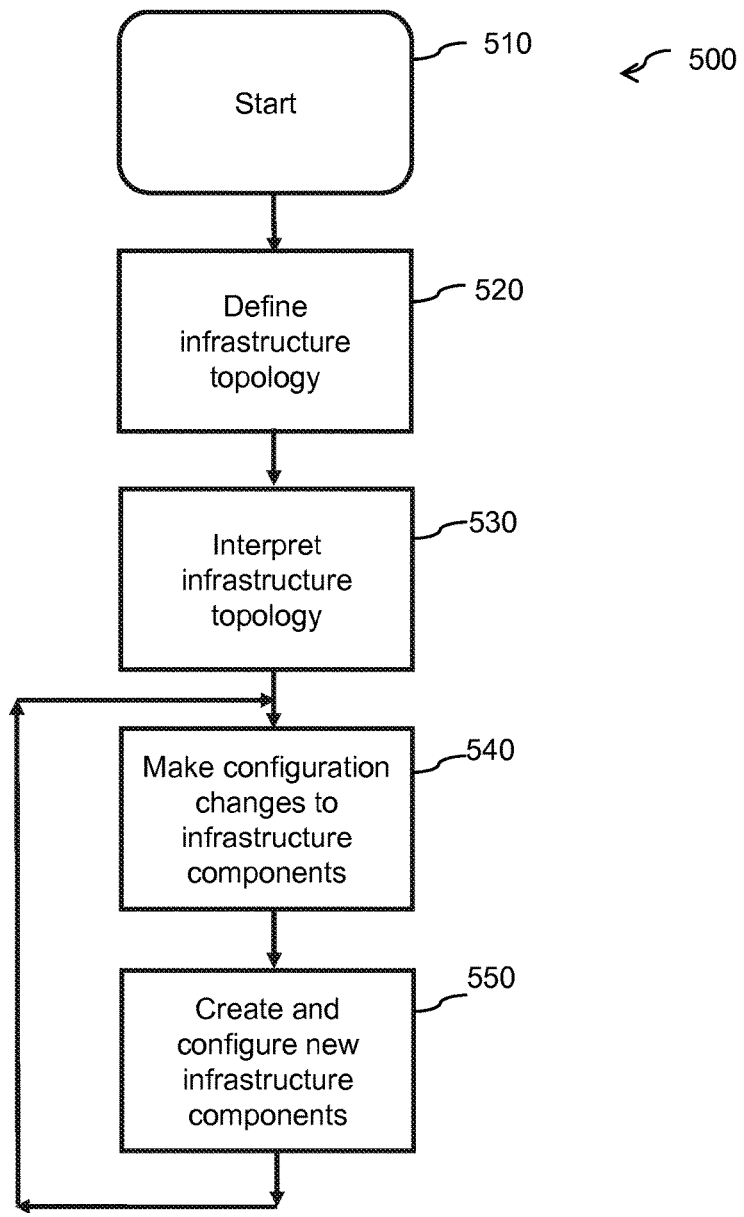
FIG. 5 is a flow chart illustrating a method for defining and configuring an environment virtualization infrastructure.

FIG. 5 is a flow chart illustrating a method for defining and configuring an environment virtualization infrastructure.

As described above, the infrastructure emulator is a system in which a user can dynamically specify a desired infrastructure through commands. The interpreter compiles the desired infrastructure into executable instructions that provision all desired infrastructure as virtual resources. Further, the virtual infrastructures can have different configurations, and the configurations can be modified dynamically, while executing side by side on the same physical hardware.

Referring again to FIG. 5, the method starts at step 510 and proceeds directly to step 520. At step 520, the infrastructure topology is defined.

If the emulator knows the desired infrastructure, it can control the underlying hardware resources automatically (that is, without manual intervention) and virtualize infrastructure resources. This knowledge can be acquired through diagraming an infrastructure topology, for example by using a GUI to specify resources, links and routes, or by interpreting existing infrastructure data files.

As described above in reference to earlier figures, the user can initialize a new infrastructure topology, and then create and configure infrastructure components. The infrastructure topology can be expressed as data structures.

After the infrastructure topology has been defined, the method proceeds to step 530. At step 530, the emulator reads the topology data structures and generates instructions to the virtual elements of the infrastructure (including compute, network and storage elements). At step 530, the data structures of the topology components are read from, and written to, in real-time based on the infrastructure topology.

When a topology configuration change is made, the emulator can read it essentially immediately and can make an adjustment In the topology, the user can specify networks (switches, hubs, or other network components), machines attached to those networks, and the routing between them. The user can also control the properties of each of the components. The emulator can use this information to generate instructions to the virtual subsystems to adjust and configure each of the infrastructure resources.

Thus, in step 530, the emulator compiles the defined topology into executable instructions to be given to the virtual subsystems, thereby creating most, if not all, components as deployed virtual resources. The method then proceeds to step 540.

At step 540, the emulator makes configuration changes to infrastructure components in real-time. At step 550, the emulator adds new infrastructure components to the deployed infrastructure. Like existing components, new components can be started, controlled and configured independently in real-time. The method loops back to step 540 and repeats steps 540 and 550.

An environment virtualization infrastructure, such as the ones described above, can be migrated from one hardware system to another. Moreover, more than one infrastructure can run on the same underlying hardware while isolated from each other.

In the prior art, the management of virtual machine images was done by making whole copies of each new virtual machines disks. This approach takes up large amounts of storage and requires much longer provisioning times since the whole disk was copied for each new machine.

A technique called copy on write allows a new virtual machine to be provisioned whose disk image started as a pointer back to a base image and was allowed to grow and track changes as a delta to the original image. One shortcoming of this approach is that the assignment of copy-on-write and full copies must be done on an individual virtual machine basis and requires significant configuration time.

One aspect of the system and method described in the present application is known as hypercloning Hypercloning includes the automatic creation, optional persistence, and automatic garbage collection of virtual machine disk images.

Hypercloning can be implemented by establishing master images, and then having virtual machines create copy-on-write clones when they boot up. When persistence is turned on, a clone can be kept indefinitely between startups of virtual infrastructure. When the system detects that a clone is no longer being used, it can clean up the clone.

Hypercloning, as described here, can be used to create, and destroy, a plurality of virtual machines in an efficient manner. A plurality of master disk images is maintained by the system. A master image can be created by the system or uploaded to the system by a user.

As described previously, virtual environments can be created and modified in order to define an infrastructure topology. When a new virtual environment is defined or an existing virtual environment is modified, a disk image can be added to the environment as a clone of a master image. If the disk image clone is set to be persistent, then changes made to that image will remain after the topology has been stopped and then restarted. If the disk image clone has not been placed into a persistent mode, then the disk image state will revert to the state of its associated master image after the topology stops and is restarted.

A subset of disk image clones within a plurality of disk images can be marked as either persistent or non-persistent. If the system determines that a clone is no longer being used, then the system can remove the clone.

One advantage of the system and method described herein is known as MAC precognition. A media access control (MAC) address is a unique identifier assigned to network interfaces for communications on a physical network segment. A network switch uses the MAC address of network elements in order to route packets.

In the prior art, hardware networking environments rely on Media Access Control (MAC) learning techniques, such as Address Resolution Protocol (ARP), in order to discover the link layer switching topology of a network. Using the system described in the present application, MAC learning techniques become obsolete for hypervisor-controlled link layer devices because the link layer switching topology is known when the virtual environment is activated. Moreover, MAC precognition can update the hypervisor's link layer switching tables in real-time on running virtual environments within the system or virtual platform.

MAC precognition works as described in the following paragraphs.

When the emulator (described previously) parses the data structures that define the virtual environment, link layer MAC addresses for virtual switches, machines, routers and the like are either predefined or generated according to a pseudorandom sequence.

During the generation of the interpreted networking topology, virtual switches are generated in the hypervisor for data link layer network communication. Multiple switches can be generated dynamically in order to support the number of networks defined in the infrastructure topology. A single virtual switch spanning two or more hypervisors can be broken into switch slabs that communicate seamlessly through Network Layer tunneling.

The MAC addresses associated with each virtual switch interface, as defined by the interpreter, can be used to build MAC address switching tables on each virtual switch interface without the need for discovery protocols. By creating a logical graph representing connections between virtual switches and their tunneling interface, the interpreter is able to compute the connectivity paths between each virtual interface. These paths can then be used to build MAC switching tables for each virtual network interface and each virtual tunneling interface.

During the interpretation of the virtual machine definitions, these virtual machines are attached to their defined virtual networks via virtual switch interfaces on the generated virtual switches. Since the infrastructure definition contains the MAC addresses for each machine, the switching tables for each virtual switch interface can be programmed with each attached machine's MAC address. The incoming and outgoing switching table of each tunneling interface can be updated with a list of MAC addresses for machine and virtual switch interfaces that are associated with its own slab. Switching tables between slab tunnels can be exchanged so that each tunnel between each slab can be aware of the appropriate tunnel interface for MAC addresses located on the virtual network.

The interpretation of the virtual routers is identical to the interpretation of the virtual machines since routers and machines are identical to each other at the link layer.

Before the environment becomes operational, each virtual network, tunneling, router, and machine interface can be aware of which interface network layer frame packets are to be switched in order for the frames to reach their desired destination within the virtual network. There is no need for the hypervisor to implement conventional MAC learning protocols that rely on broadcasting mechanisms in order to discover which MAC addresses are associated with each switch interface.

Since the emulator can add and remove infrastructure components at runtime, MAC precognition, as described above, can support dynamic updating of link layer switching tables. When entities with link layer networking capabilities are added to, or removed from, a running virtual environment, the switching tables of other entities on the same network can be similarly updated, allowing nearly instantaneous convergence of the network switching topology.

Environment virtualization infrastructure as described above can be deployed side by side with conventional IT or cloud infrastructure. Such hybrid systems can be beneficial when adding new infrastructure to a legacy infrastructure.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A system comprising:
 (a) a physical hardware platform comprising one or more processors, storage devices and network devices, wherein said hardware platform includes an operating system kernel that provides namespace isolation for processes, networks, users, inter-process communication resources and mount points;
 (b) a virtual platform configured to run on said physical hardware platform, said virtual platform comprising an infrastructure emulator;
 (c) a plurality of environment virtualization infrastructures configured to run on said virtual platform, each of said plurality of environment virtualization infrastructures comprising a respective runtime environment, said runtime environment comprising:
  (i) an infrastructure topology comprising individually defined storage, network, and compute elements;
  (ii) a plurality of actionable data structures based on said infrastructure topology, wherein said data structures can be automatically moved among said processors, said storage devices and said network devices of said physical hardware platform via routes established by said infrastructure emulator in response to the resource availability of said physical hardware platform;
  (iii) an interpreter operable to compile said actionable data structures into executable instructions for individually provisioning each of said storage, network and compute elements as virtual resources to run on said virtual platform, and for dynamically making changes to said storage, network and compute elements individually, and in real-time, during operation of said environment virtualization infrastructure, wherein said virtual resources are run as isolated namespaces in said operating system kernel; and
 (d) an interface comprising at least one of a user interface and an Application Programming Interface, said interface operable to generate said infrastructure topology via user commands to said infrastructure emulator, wherein a first one of the plurality of environment virtualization infrastructures is isolated from a second one of the plurality of environment virtualization infrastructures.

2. The system of claim 1, wherein said actionable data structures are downloaded onto storage media.

3. The system of claim 1, wherein said emulator is invoked via an Application Programming Interface.

4. The system of claim 1, wherein said at least one of said plurality of environment virtualization infrastructures is implemented as a Software as a Service.

5. The system of claim 1, wherein at least one of said plurality of environment virtualization infrastructures comprises:
 (i) a router;
 (ii) a switch;
 (iii) an operating system;
 (iv) a software application;
 (v) an application programming interface; and
 (vi) a remote interface.

6. The system of claim 5, wherein said remote interface is a web interface.

* * * * *